UNITED STATES PATENT OFFICE.

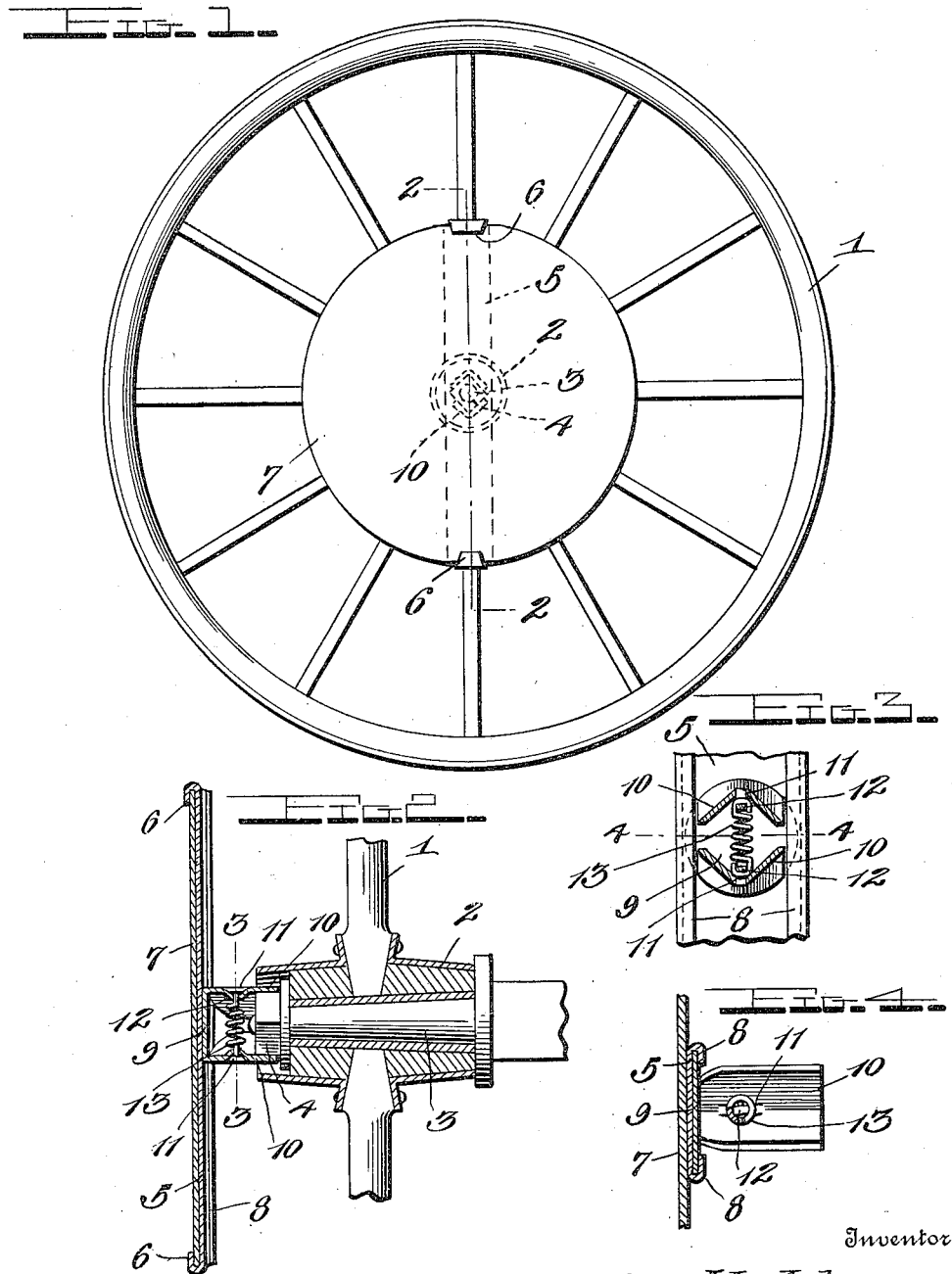

WALTER HALL JOBE, OF KANSAS CITY, MISSOURI.

ATTACHING DEVICE.

1,045,558.   Specification of Letters Patent.   Patented Nov. 26, 1912.

Application filed February 28, 1912. Serial No. 680,521.

*To all whom it may concern:*

Be it known that I, WALTER HALL JOBE, a citizen of the United States, residing at Kansas City, in the county of Jackson and State of Missouri, have invented certain new and useful Improvements in Attaching Devices, of which the following is a specification, reference being had to the accompanying drawings.

This invention relates to new and useful improvements in advertising devices adapted to be supported at the sides of the wheels of a vehicle, and the invention has for its object the production of a device of this character that may be affixed to the axle nut of a vehicle axle spindle, by which the device is supported at the side of the vehicle wheel journaled to the axle spindle.

Another object of the invention is to provide an advertising device of this character which will possess advantages in points of efficiency and durability, is inexpensive of manufacture and at the same time is simple in construction and operation.

With the above and other objects in view the invention consists in the novel features of construction and the combination and arrangement of parts hereinafter more fully described, pointed out in the claims and shown in the accompanying drawings, in which:—

Figure 1 is an elevation of a vehicle wheel showing my improved advertising device applied thereto; Fig. 2 is a sectional view on the line 2—2 of Fig. 1; Fig. 3 is a sectional view on the line 3—3 of Fig. 2; and Fig. 4 is a sectional view on the line 4—4 of Fig. 3.

Referring more particularly to the drawings 1 indicates a vehicle wheel having a hub 2 that is journaled to the spindle 3 of a vehicle axle. A nut 4 is threaded onto the outer end of the axle to hold the wheel 1 to the axle spindle 3. The securing plate 5 is formed of a single piece of sheet metal having its ends bent upon themselves, as shown at 6, to securely clamp the advertising sheet or plate 7 to the plate 5.

The longitudinal edges of the plate 5 are bent rearwardly upon themselves to form the guides 8 for the circular plate 9, said plate having two angular clamping arms 10 formed integral therewith. The arms 10 are disposed at diametrically opposite points so that their respective angular portions are divergently arranged and adapted to be clamped upon diametrical opposite corners of the nut 4. The clamping arms may be made large enough in proportion to clamp against the entire outer surface of the nut.

The angular arms 10 are provided with the slits 11 at the intersection of the two faces of said arms, and the portion 12 between said slits being bent inwardly to form securing members for each end of the coil spring 13.

The spring 13 is arranged between the two arms and having its ends secured to each of the arms to hold them in clamping engagement with the nut 4 on the axle.

It will be readily seen that the plate 9 may be adjusted on the plate 5 so that the advertising plate 7 can be disposed at various heights with respect to the wheel.

The herein described advertising device may be readily associated with the wheel of any vehicle and it will be readily appreciated that inasmuch as the plate 9, and the arms 10, by which the plate 7 is supported, are attached to and supported by the axle nut 4 of the spindle, the advertising plate 7 is always maintained in a fixed position, relative to the vehicle wheel which revolves back of it.

While I have shown and described the preferred form of my invention it will be obvious that various changes within the scope of the appended claims in the details of construction and in the proportions may be resorted to for successfully carrying my invention into practice without sacrificing any of the novel features of construction or departing from the scope thereof.

Having thus described my invention, what I claim is:—

1. The combination of a securing plate, an advertising sheet secured to one side thereof, said plate having its longitudinal edges bent rearwardly to form guides, a circular plate arranged in said guides for sliding movement, angular clamping arms formed on said plate at diametrically opposite points and adapted to engage the axle nut of a vehicle, and means carried by said arms to hold them in clamping engagement with the nut.

2. The combination of a securing plate, an advertising sheet secured to one side thereof, a circular plate adjustably secured to the other side of said plate, angular clamping arms secured to said circular plate and arranged at diametrically opposite points and adapted to engage the axle nut of a vehicle, said arms being provided with slits at the intersection of the two faces thereof, the intermediate portion of said slits being bent inwardly and a coil spring arranged between said arms and having its ends secured to the intermediate portion of the slits to hold said arms in clamping engagement with the nut.

3. In a device of the character described the combination of a securing plate, an advertising sheet secured to one side thereof, a circular plate adjustably secured to the other side, angular clamping arms secured to said circular plate and a coil spring arranged between said arms and having its ends secured to said arms.

In testimony whereof I hereunto affix my signature in the presence of two witnesses.

WALTER HALL JOBE.

Witnesses:
 D. C. PETTIT,
 J. EDWARD TEETERS.

Copies of this patent may be obtained for five cents each, by addressing the "Commissioner of Patents, Washington, D. C."